(12) United States Patent
Whitner et al.

(10) Patent No.: US 10,333,816 B2
(45) Date of Patent: Jun. 25, 2019

(54) KEY NETWORK ENTITY DETECTION

(71) Applicants: Richard Bennett Whitner, Fort Collins, CO (US); Kumar Shashank, Hyderabad (IN); Saurabh Grade, Muzaffarnagar (IN)

(72) Inventors: Richard Bennett Whitner, Fort Collins, CO (US); Kumar Shashank, Hyderabad (IN); Saurabh Grade, Muzaffarnagar (IN)

(73) Assignee: CA, Inc., New York, NY (US)

(\*) Notice: Subject to any disclaimer, the term of this patent is extended or adjusted under 35 U.S.C. 154(b) by 24 days.

(21) Appl. No.: 14/861,047

(22) Filed: Sep. 22, 2015

(65) Prior Publication Data

US 2017/0085456 A1  Mar. 23, 2017

(51) Int. Cl.
  *H04L 12/26* (2006.01)

(52) U.S. Cl.
  CPC ............ *H04L 43/103* (2013.01); *H04L 43/08* (2013.01)

(58) Field of Classification Search
  CPC .............................. H04L 43/103; H04L 43/08
  USPC ......................................................... 370/252
  See application file for complete search history.

(56) References Cited

U.S. PATENT DOCUMENTS

| | | | | |
|---|---|---|---|---|
| 2003/0035434 A1* | 2/2003 | Le | ........................... | H04L 47/24 370/443 |
| 2004/0156350 A1* | 8/2004 | Brasic | .................. | H04W 74/06 370/346 |
| 2005/0204397 A1* | 9/2005 | Miyazoe | .................. | H04B 3/46 725/107 |
| 2005/0254419 A1* | 11/2005 | Barker | ................ | H04L 43/0894 370/229 |
| 2006/0104208 A1* | 5/2006 | Walker | ................ | H04L 41/0631 370/242 |
| 2007/0074076 A1* | 3/2007 | Imai | ..................... | G06F 11/0709 714/26 |
| 2010/0177650 A1* | 7/2010 | Wittgreffe | ................. | H04J 3/14 370/252 |
| 2011/0026456 A1* | 2/2011 | Pera | ...................... | H04W 74/06 370/328 |
| 2011/0302299 A1* | 12/2011 | Fischer | ................... | H04L 67/22 709/224 |
| 2012/0069752 A1* | 3/2012 | Larocque | ................ | H04L 41/12 370/252 |
| 2012/0218979 A1* | 8/2012 | Yeh | ................... | H04W 52/0222 370/338 |

(Continued)

*Primary Examiner* — Ricky Q Ngo
*Assistant Examiner* — Ellen A Kirillova
(74) *Attorney, Agent, or Firm* — Baker Botts L.L.P.

(57) ABSTRACT

A method includes receiving, for each of a plurality of entities in a network, device information associated with the entity, and network traffic information regarding data packets associated with the entity. The method also includes determining, using a processor, a priority score for each of the plurality of entities in the network based on the device information and the traffic information. The method additionally includes determining a polling frequency for each of the plurality of entities based on each priority score, wherein the polling frequency for a first entity having a first priority score is greater than the polling frequency for a second entity having a second priority score that is lower than the first priority score. The method further includes polling each of the plurality of entities at its polling frequency.

20 Claims, 4 Drawing Sheets

(56) References Cited

U.S. PATENT DOCUMENTS

| | | | | |
|---|---|---|---|---|
| 2014/0282540 A1* | 9/2014 | Bonnet | ............... | G06F 9/45558 |
| | | | | 718/1 |
| 2016/0105317 A1* | 4/2016 | Zimmermann | ....... | G06F 9/4445 |
| | | | | 709/221 |
| 2016/0112359 A1* | 4/2016 | Allen | ..................... | H04L 51/14 |
| | | | | 709/206 |

* cited by examiner

KEY NETWORK ENTITY DETECTION

BACKGROUND

The disclosure relates generally to network entities, and more specifically to key network entity detection.

SUMMARY

According to one embodiment of the disclosure, a method includes receiving, for each of a plurality of entities in a network, device information associated with the entity, and network traffic information regarding data packets associated with the entity. The method also includes determining, using a processor, a priority score for each of the plurality of entities in the network based on the device information and the traffic information. The method additionally includes determining a polling frequency for each of the plurality of entities based on each priority score, wherein the polling frequency for a first entity having a first priority score is greater than the polling frequency for a second entity having a second priority score that is lower than the first priority score. The method further includes polling each of the plurality of entities at its polling frequency.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
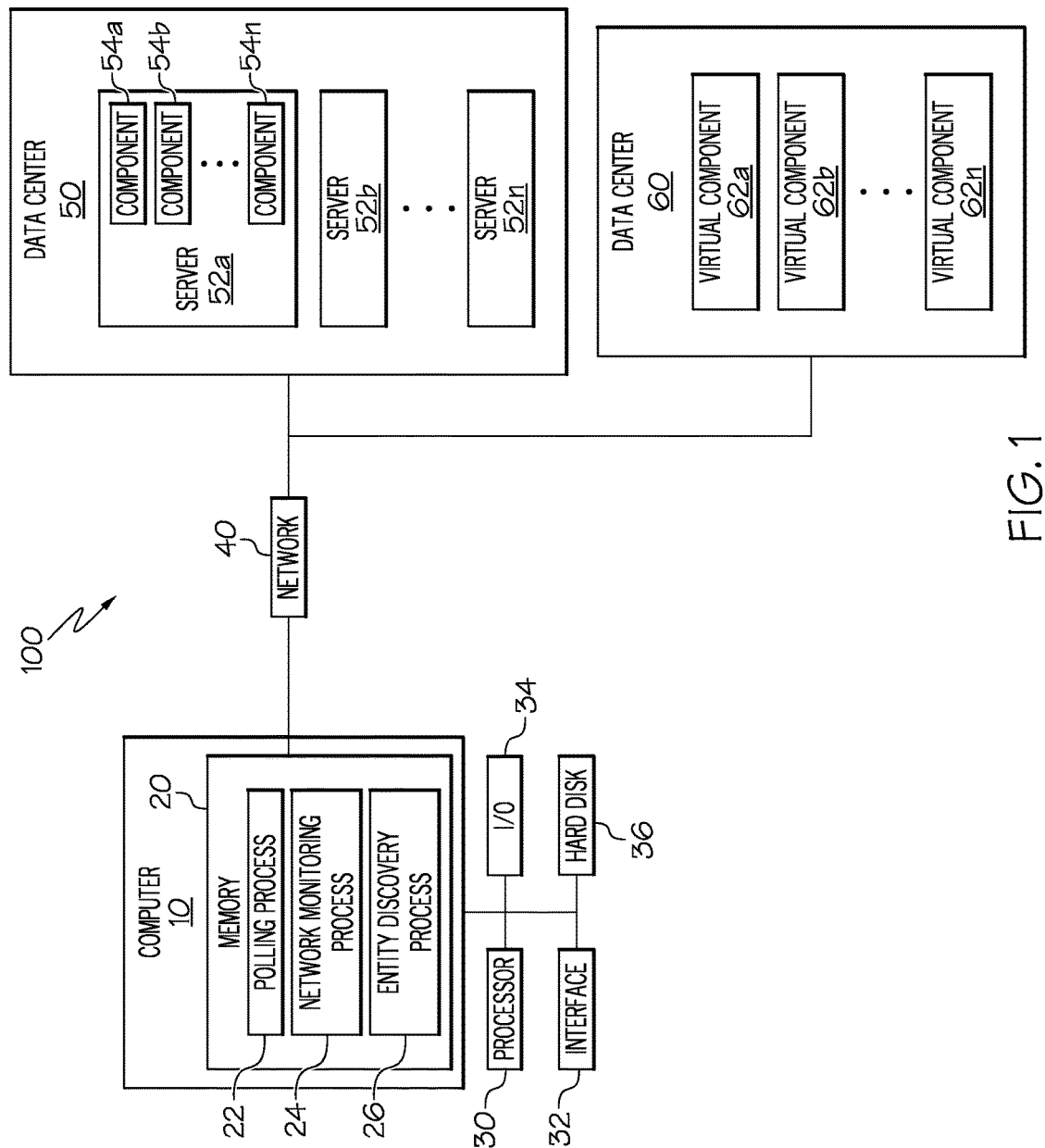
FIG. 1 illustrates a block diagram of a system for key network entity detection in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Infrastructure management tools provide network visibility to IT administrators, enabling maintenance of business services and applications hosted in complex IT infrastructures. Infrastructure management solutions can help organizations optimize operational efficiency while reducing complexity, cost, and hassle associated with use and integration of multiple network monitoring tools. These tools often include network monitoring systems including connectivity monitoring for network devices such as routers, switches, servers, applications, printers, and many other network devices. Probes or agents can verify network and TCP-based connectivity and report back to a central monitoring system for tracking and analyzing real-time network information. These systems may additionally include dashboards and alarms for creation and customization of network monitoring interfaces showing up-to-the-minute status of critical network information including information regarding network links, bandwidth utilization, network latency, response times, and other critical network issues.

These systems allow businesses to track and manage network availability and performance parameters such as network interface utilization, error rates, connectivity failures, latency and any other technical items from a service-level perspective. These systems additionally deliver availability, performance, and service level management for heterogeneous IT networks in a solution that automatically discovers network devices and interfaces and monitors device health and performance, providing bandwidth performance and analysis reporting for critical networks. Network availability and performance information is presented in graphical dashboards and reports via a secure, multi-tenant web portal that enables enterprises and service providers to efficiently deliver information to internal or external business audiences.

In certain embodiments, devices connected to a network are automatically discovered and configured for polling or monitoring, significantly reducing the amount of set-up or configuration time. Thus, administrators may initialize monitoring for thousands of network devices and interfaces in a relatively short period of time. Filters can be applied to select particular devices for bulk manual configuration operations.

Special probes and gateways provide automated and user-driven access to device status information. Probes may have their own interface to facilitate administrative and operational activities. For example, network and application connectivity monitoring probes may be deployed to ensure end users and business consumers have access to business-critical network devices. Any IP-enabled device may be monitored, including routers, switches, servers, printers, and the like. Specialized probes use ICMP ECHO tests to verify network connectivity between the host on which the probe resides and the targeted remove system. Probes may also test connectivity to TCP-based services, such as Telnet and HTTP, as well as any other application with a designated service port for monitoring.

Fault management systems use system entity status checking procedures to detect system faults and determine the root causes of system faults. One form of status determination includes polling devices for their availability and/or reachability using Simple Network Management Protocol (SNMP) pollers.

SNMP pollers are used to manage devices on IP networks. SNMP includes an application layer protocol, a database schema, and a set of data objects, and is supported by routers, switches, servers, workstations, and printers. SNMP data monitoring probes enable tracking the performance of these network devices against a management information base for managing entities in a communication network.

Certain legacy polling systems may poll network devices at a standard or similar polling frequency. While the polling frequency is often initially set at a moderate level, so as to not overwhelm the network, as devices are added and/or polling frequency is increased (such as during a system fault), the network traffic resulting from the polling system's polling operations increases linearly. For example, as devices are added to a network managed by a traditional polling system, the sheer volume of polling messages may delay other critical network communications from being transmitted. Polling packets transmitted in a packet-switched network to each of the devices connected to a large-scale IT infrastructure may create a substantial amount of network traffic that does not immediately service a customer or user need. Thus, this traffic may be categorized as low priority traffic. While certain mechanisms may exist to give priority to higher priority network traffic, the transmission of these additional network packets may even still delay the higher priority network traffic due to bandwidth or volume related network bottlenecks.

In some instances, network traffic resulting from polling operations increases even more dramatically, such as exponentially. For example, in response to determining that a device is down, a polling system may poll neighbors of the disabled device. Similarly, neighbors of the neighboring devices may also be polled. This process may result in polling the same devices multiple times, which also increases network congestion due to polling operations.

Further, when polling is conducted periodically, that is at a predetermined frequency, the volume of polling packets transmitted on the network increases linearly as a function of time. This can create a strain on limited network resources, such as routers and the like, especially during peak traffic or utilization times. Further, the resources being polled use system resources to respond to the polling inquiry. For example, the system gathers utilization information and status information, package that data, and transmit a response message in response to the polling message.

Smart polling systems reduce polling burden on the network by dynamically limiting the scope of polled entities.

For example, instead of polling each network device on a network at a set polling frequency, smart polling systems intelligently modify the polling frequencies for network devices based on various criteria.

One example smart polling system includes dynamically changing polling targets and frequencies when a fault is detected. This includes using a device topology to locate a network fault and determine related network entities that can provide useful information in assessing the status of or resolving the fault. Those entities are then polled at an increased frequency during the pendency of the fault. When the fault is resolved, the polling frequency can remain elevated to ensure the system is operational and eventually can be tapered to original polling frequency levels.

In certain embodiments, if a device is determined to be a root cause, polling other devices determined to be symptomatic to the root cause can be suspended until the root cause is resolved. The symptomatic nodes themselves may have underlying problems that require diagnosis through polling operations. However, polling these devices before the root cause node is resolved may be futile. Accordingly, polling operations may be further reduced by suspension of such polling activities until the root cause is resolved.

The teachings of the present disclosure present a smart polling system for reducing the polling burden on a network by assessing the relative importance of each network entity and determining a set of key network entities through various techniques. These key network entities are polled more frequently since their status is considered more important to a goal of an organization. In particular embodiments, a weight or importance is determined for a set of entities on a network, and a polling frequency is set for each entity based on the weight or importance. For example, more important or higher weighted entities are polled more frequently than less important entities. Network entities may be deemed important based on a variety of factors such as the device type of the entity, or the type of network traffic that the entity transmits or receives. Status information regarding important entities is updated at a central network entity server more frequently while less important entities' statuses are updated less frequently. Such a configuration can reduce the load on a network by decreasing polling messages and responses from less important network entities. Additionally or alternatively, increased polling of important network devices can reduce or eliminate down time of network entities during a failure. The information received from more frequent polling can be used to update other systems that manage various aspects of network entity life-cycles, such as deployment, service, error-triage, and repair.

With reference to FIG. 1, a system 100 for key network entity detection is illustrated in accordance with a non-limiting embodiment of the present disclosure. System 100 includes a computer 10, network 40, data center 50 with physical server components and data center 60 with virtual server components. Computer 10 includes a memory 20, processor 30, interface 32, input/output 34, and hard disk 36. Processor 30 loads and executes instructions from hard disk 36 in memory 20. For example, processor 30 executes a polling process 22, a network monitoring process 24, and an entity discovery process 26. Data center 50 includes various physical server components. Components may include any device capable of being connected to a network. For example, components may include any addressable device or device capable of being assigned an IP address. In certain embodiments, components may encompass computing units as small as configuration items. Accordingly, server 52a includes components 54a-n which include various computing components and devices. Components also include virtual computing components as illustrated with respect to data center 60.

Network monitoring process 24 is an infrastructure management process that manages various systems for tracking and maintaining a large IT infrastructure such as data centers 50 and 60. Polling process 22 is one aspect of network monitoring process 24. For example, polling process 22 may poll managed network devices for status information at a predetermined polling rate and stores the status information in a database. The polling information may have value as historical data points for trend analysis and other intelligent processes in connection with network monitoring process 24 or other network management applications.

Entity discovery process 26 uses polling process 22 and other network data to discover network entities and retrieve information regarding those entities. For example, entity discovery process 26 queries a network router for information regarding entities connected to the network, such as IP addresses for each entity. Entity discovery process 26 uses this information to ping each entity, at each corresponding IP address, for information. The requested information includes operating system type, file system type, a number of ports associated with the entity, a number and type of applications running thereon, a type of network entity, virtual component information, and the like. For example, entity discovery process 26 may discover several server 52a-n and virtual components 62a-n on network 40. Entity discovery process 26 uses a network device management protocol to communicate with and receive information regarding each component 54a-n on server 52a, and other components, applications, interfaces, and the like, at each of servers 52a-n and virtual components 62a-n.

Entity discovery process 26 can also discover information regarding network traffic that each network entity is associated with. In certain embodiments, the network traffic is determined by interaction with the network entity. For example, server 52a can be configured to monitor or store network traffic it receives. As another example, an application running on server 52a monitors network traffic for all ports of server 52a.

In certain configurations, entity discovery process 26 or network monitoring process 24 monitors network traffic to/from each discovered network entity. These processes may deploy software or agents to network entities, such as servers, or network infrastructure entities, such as routers and switches, to monitor traffic. The software or agents may "sniff" packets for certain information, such as destination IP address, source IP address, data packet payload, transmission date, transmission time, and the like. The agents create logs to store this information for real time or future analysis. The logs can be used to make a determination regarding the network traffic. In certain embodiments, copies of data packets transmitted on the network, or a subset thereof, are stored for later inspection by a network management process.

These types of network monitors or agents may be capable of determining whether particular data packets are related to particular aspects of an organization. For example, data packets can include indicators as to the type of application or information that they relate to. An application ID transmitted in a data packet can indicate that a particular data packet is related to a financial transaction application, such as an online credit card processing application. This type of information may be considered extremely valuable to an organization because it represents an avenue for the organization to receive revenue. One or more associated network entities may be determined with reference to other fields of the network monitor log or data packet. These entities may be given a high importance due to the critical nature of the network traffic that they carry.

Other criteria for determining the importance of network components may be employed. In certain embodiments, customer provided reference data which designates roles of devices can also be used to determine the importance of particular network entities. For example, roles assigned to various network entities by an administrator can be associated with various importance levels.

The importance of each entity is reflected in a priority score that can be used in the network topology to identify important nodes or entities in a network. Other factors that affect the priority score include entity type, entity location or relation to other important network entities, as well as related network traffic, as discussed above. In certain embodiments, certain network entities that are determined to be the root cause of prior network issues may be given a high importance or priority score.

As another example, network traffic logs may indicate that a particular network entity is largely responsible for inter-office chat or instant message communications. These communications may be useful, but not critical to an organization's overall goals. Accordingly, entities associated with this type of network traffic may be given a lower priority score. Any type of traffic can be regarded as low importance or high importance based on goals of the organization or any other criteria.

In certain embodiments, the location and/or relationships between network entities may indicate that a particular entity is important to an organization. For example, a centrally located network entity, such as a gateway router, may control access to an external network. Thus, if this router becomes inoperable, the entire organization may lose internet access. Such a network entity is often highly important to an organization and should be assigned a high priority score.

An interface assists a network administrator in creating and allocating priority score weights and importance levels to various types of internet traffic. The interface additionally enables the administrator to create a new type of network traffic for detection by the network monitoring process 24 and entity discovery process 26 based on a particular application or characteristic of the traffic. In certain embodiments priority score weights are linked to device type or location. For example, traffic can be designated as a particular type of traffic based on the kind of device it comes from or the location of the source or destination devices.

Once information is gathered about each network entity, and a priority score is assessed to one or more entities, a network map or topology can be created and used by network management processes. Polling process 22 may poll each component in data centers 50 and 60 at a predetermined polling rate based on the priority scores assessed to each network entity. For example, an entity with a high priority score may be polled at a relatively high polling frequency, while an entity with a low priority score is polled at a relatively low polling frequency, or, in some cases, not polled at all. Thus, the network is spared the excess polling communications for lower importance entities. Accordingly, the network is free to accommodate other traffic. Further, network monitoring process 24 receives updates regarding high importance entities more frequently.

The priority scores may also be referred to as a "weight" that is applied to a polling frequency. For example, entities that are important to an organization may be assigned a higher weight. The weight may be multiplied by a set polling frequency to create a resulting polling frequency that his higher than the original frequency.

In certain embodiments, the weight or priority scores may be based on past fault isolation results. For example, a fault isolation process may determine, among other things, root causes of past faults based on detected network events that signal an impending network fault or other event. Entities that are associated with the root causes of these faults or events may be given higher priority scores, since it is important for network monitoring processes to track the status of these entities.

In certain embodiments, network monitoring process 24 uses polling information and other information from entity discovery process 26 to construct a network device topology map of data centers 50 and 60. The device topology map includes nodes corresponding to each component, such as components 54*a-n* and 62*a-n*. Network monitoring process 24 may additionally construct edges in the topology map corresponding to relationships between each component. For example, components 54*a-n* may share a relationship based on their configuration in server 52*a*. Thus, an edge may be constructed in the device topology map between each node corresponding to component 54*a-n* and/or between each node corresponding to component 54*a-n* and server 52*a*. The network topology map may additionally contain the priority scores for each network entity and assists in configuring entity polling operations.

In certain embodiments, a device topology may be constructed by discovering devices connected to a network and discovering information regarding relationships and connections between the devices. The devices may be represented in the topology by nodes, with edges between each node representing a relationship between the devices in the network. Relationships may include physical network connections, virtual system relationships, and shared attributes, properties or the like. The topology may represent a variety of physical and virtual system components, and may be displayed in a graphical representation so that an administrator can quickly identify network devices and status information regarding the health of a managed network.

For example, an infrastructure management system maintains information regarding managed devices, including operating system, device type, connection type, IP address, device name, component type, status information, utilization information, memory capacity, CPU capacity, hard drive capacity, and virtually any other property of a connected device. In certain embodiments, SNMP polling is used to determine values for each of these properties for each connected device. Each of these devices may be represented in a device topology, for example, by nodes in the topology. Each node in the topology may be connected by one or more edges to another component in the topology. The edges may represent various relationships such as physical or virtual connections. For example, a server hosting a number of virtual machines is represented with an edge between the server and each virtual machine. In this case, the edge represents the relationship between the server and each hosted virtual machine. However, edges may represent other relationships, such as a relationship between devices connected by a network, or that devices share some properties or characteristics. Further devices that are associated with a particular application or service may be represented as being connected by an edge in the network topology. The network topology indicates that the devices service the same application via edges in a device topology map.

Network monitoring process 24 may map the fault or error condition to a particular node in the device topology and increase the priority score for that node. For example, errors, faults, or alerts may be associated with one or more particular components in the network. The network monitoring process maps the received faults, errors, and alarms to particular corresponding nodes in the device topology. The mapping process may use information in any received alerts or alarms to determine affected components. Thus, network monitoring process 24 may make determinations as to which components are the source of a particular error or fault. These components may receive a higher weighting or priority score than other components due to their propensity to generate faults. In certain embodiments, errors or faults are triggered by network monitoring process 24 based on monitoring data for a particular component varying from a particular threshold range. In such scenarios, the system may simply map the error to the corresponding node in the device topology. In the same way, these nodes can have an increased or decrease priority score or weighting.

In certain embodiments, network monitoring process 24 determines components or devices that are associated with high priority components. For example, when the infrastructure management process determines that error conditions have manifested or occurred at a first network device, network monitoring process 24 determines devices that are connected to or related to the first network device and increases their priority scores or weighting.

In certain embodiments, devices or components that may be affected by errors caused by a first network entity are determined and given increased priority scores. The system may make a determination as to which devices would be affected by an error in a particular network device based on the type of error or the relationship between the devices as expressed by the network topology.

Network monitoring process 24 instructs polling process 22 to modify the polling frequency, intensity, interval, or the like for the related components based on the priority score or weighting. For example, when the system indicates that a router is down, the system determines which components might be, or are, affected by the router being down, and modifies their priority scores accordingly. The system next determines an appropriate polling interval for those affected components based on the priority scores. The appropriate polling interval may be sufficiently high so that interested parties and applications can be updated quickly on device status changes. In this example the system may undertake a cost benefit analysis regarding increasing the polling frequency for the related network components. The cost benefit analysis may include considering the costs in terms of network latency or delay caused by increased polling operations in comparison to the benefits gained by interested applications or users being kept abreast of these updates.

Figure 2:
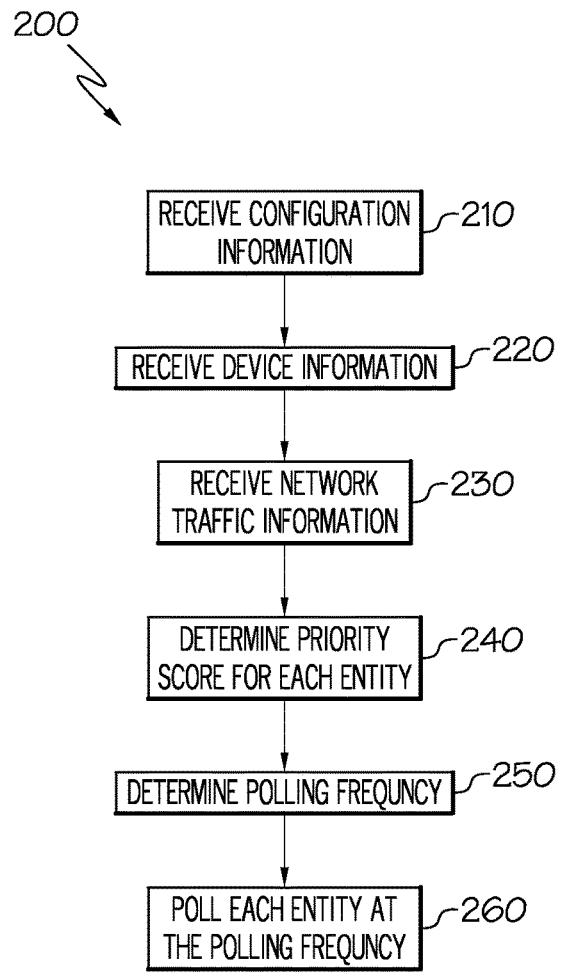
FIG. 2 illustrates a flow chart of a method for key network entity detection in accordance with a non-limiting embodiment of the present disclosure.

With reference to FIG. 2, a method for key network entity detection is illustrated in accordance with a non-limiting embodiment of the present disclosure. At step 210, configuration information is received. Configuration information includes information regarding configuration items or entities on the network. In certain embodiments, configuration items may refer to the smallest granular device that is capable of network connectivity. For example, a server can be represented as a single configuration item. In certain embodiments, that same server may be represented by many configuration items. For example, each component within the server may be a configuration item. Virtual machines hosted by the server may be a configuration item, while hardware devices embedded in the server may also be configuration items.

In certain embodiments, a network monitoring system accesses information regarding configuration items, such as setup information, hardware information, and software specifications. This information may be used in addition to or alternatively to other types of received information, such as device information, to prioritize network entities.

At step 220, device information is received. For example, each network entity in a local area or enterprise network may be discovered by an entity discovery process. This includes virtual and physical entities. The entity discovery process queries each discovered entity for more information, and compiles a list of network entities and their properties.

In certain embodiments, device information includes configuration information and reference information regarding each particular device. For example, device information may result from previous polling operations to discover information regarding a connected device. Configuration information may be a predetermined set of device information, such as default information provided for each device. Reference information can be information received from a database of information regarding the network entity.

Configuration data may include numerous types of data. For example, configuration data can include parameters that govern the basic operation of the application (i.e., the management system or operation components of the management system). This may include parameters such as log level, name of log files, etc. The number and variety of these parameters can vary from application to application. Parameters can also vary in scope to which they apply, e.g., some parameters for the application as a whole, some for components within the application, etc.

Configuration data may also include metadata. Metadata configuration provides information regarding software and hardware capabilities and preferences, and allows configuration parameters to be applied on a general basis. Metadata is generally referred to as "data about data". In database parlance, this could refer to the schema. The key distinction with metadata is "type" vs. "instance". Metadata refers to types of things but not necessarily instances (although instance data may be included). In certain embodiments, metadata describes or models things that are monitored and managed. For example, metadata can include information such as what types of devices to monitor and what types of relationships exist between devices (e.g., a computer may have one or more CPUs, memory, one or more disks, one or more network interfaces; a computer is connected to another computer). Metadata can indicate that a device can be monitored by various types of monitoring probes, can indicate the polling protocols available; location to poll by default; default polling interval to use; priority to give to polling, and the like. Metadata can identify the types of metrics that can be monitored and the formats or units that metrics can be reported. For example, a disk can have properties that can be monitored, such as total capacity and capacity used, and capacity used can be reported as a percentage or as an absolute unit. Collectively, metadata can provide templates for defining in general what and how to monitor devices. Such templates can be copied and each copy given specific values, where the values are the instances of things to be monitored and the details of how the monitoring system should monitor the instances.

Configuration data also includes instance specific configuration. For example, configuration data includes the following instance specific examples: usage metrics on C:

drives will be monitored at 5 minute intervals; usage metrics on D: drives will be monitored at 10 minute intervals; CPU page swapping will be monitored, on 30 second intervals.

Those of ordinary skill in the art will appreciate the wide variety of configuration information contemplated by the scope of the present disclosure. Configuration information should not be limited to the specific examples listed herein.

In certain embodiments, configuration data is shipped with a product. This data is then customized for the customer's environment upon deployment, and as the product is used. Configuration data can later be loaded to control application behavior, and can be changed as part of administrative operations.

Reference data includes data that the user provides to enable enrichments to be done on the data processed on the product environment. For example, consider a wireless network service provider that is monitoring devices in their network. The service provider may maintain reference data tables that provide, for example, names and locations of cell towers and other network devices. They might also include information such as a group who has primary responsibility for maintenance of the device. This could include name(s), contact info, whether the group is in-house or contracted, etc. This reference data can be most anything. Pertinent to this context, reference data could be an importance indicator. The monitoring application can provide capabilities to find values in the reference using values found in the monitoring data, and use the values from the reference data to provide more meaningful results to the users of the application. For example, an event generated by a failing device might contain the device serial number. The device serial number could be a key field in reference data that the network service provider configures into the monitoring application. When a device failure event occurs, the monitoring application can use the device serial number if the reference data to enrich reports of device failure with the model type, manufacturer name, date purchased, etc. The monitoring application can make other processing decisions using the reference data. In certain embodiments, reference data is combined from many sources.

At step 230, network traffic information is received. The network entity discovery process or other network management process obtains information regarding network traffic that is transmitted through the network. The network traffic information can include information regarding a destination or source application, destination or source address, date/time of the transmission, associated network entities, such as routers, switches, and gateways that the information is transmitted through, and the like.

At step 240, a priority score or weight is determined for each entity. The priority score may be based on one or more of the configuration information, device information, network traffic information, and/or past fault isolation results. The priority score may reflect a relative importance of that particular entity to an organization. The importance may be based on one or more goals of the organization. For example, revenue generation is often important to organizations. Thus, those network entities that are associated with revenue generating applications, services, traffic, or the like may be given high priority scores.

At step 250, a polling frequency is determined for each network entity based on the priority score or weight. For example, a high polling frequency is assigned to network entities having high priority scores or weights. At step 260, each entity is polled at its assigned polling frequency.

Network monitoring systems may record response times to and from network devices, services, and applications to aid in pinpointing areas of excessive network latency. Network connectivity status reports and round trip performance trends are generated and leveraged for service level agreement creation, monitoring, and reporting.

Network monitor probes may provide flexible deployment options to ensure connectivity between the applications and network devices that warrant close scrutiny. In certain embodiments, lightweight network connectivity probes can be deployed strategically throughout a business infrastructure. For example, in a distributed application environment, network connectivity probes can be deployed directly on application servers and can be configured to test connectivity to end users who require access to business-critical servers. Network connectivity probes may additionally be deployed directly on end-user workstations to monitor for connectivity to the applications' servers.

Alerts and other notifications may be generated in response to detected or inferred problems with network devices. For example, if a network link between a probe and an infrastructure management console is disabled, the probe can buffer alert and performance data locally until the disabled communication link is re-enabled. Thus, network and device monitoring data is not lost due to agent connectivity issues.

Figure 3:
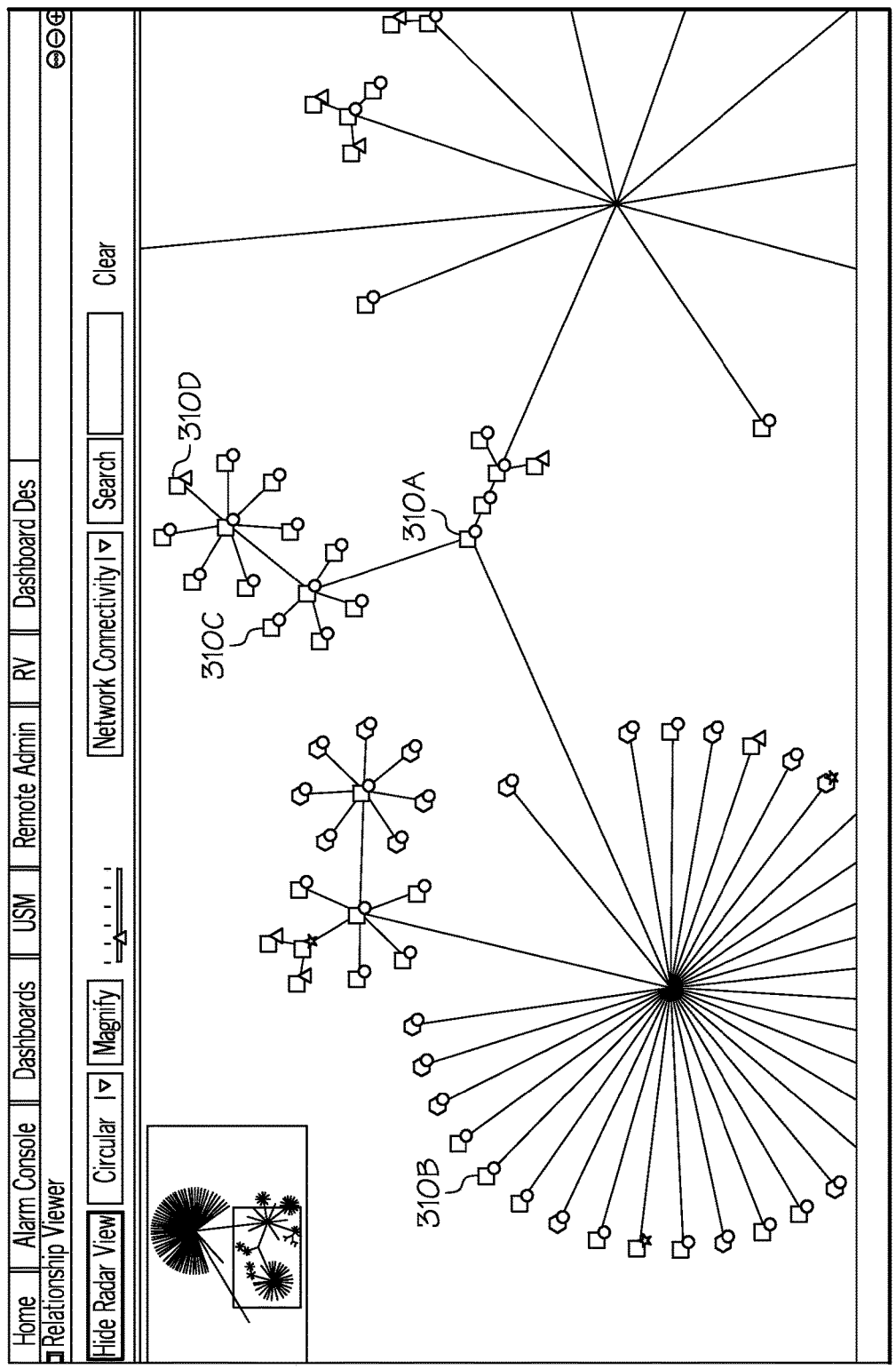
FIG. 3 illustrates an example device topology in a system for key network entity detection in accordance with a non-limiting embodiment of the present disclosure.

With reference to FIG. 3, an example device topology from a user interface of a system for key network entity detection is illustrated in accordance with a non-limiting embodiment of the present disclosure. The device topology includes a series of nodes that each represent devices in a network component device topology. Edges or lines connect the nodes in the topology map. A drop-down menu is used to select the type of relationships to display in the topology map. For example, in this display, the edges represent network connectivity. Such a display may also be used to illustrate device problems, errors, and faults, and illustrate trending utilization metrics or other performance metrics.

In certain embodiments, a priority score for each entity is reflected in the device topology. For example, entity 310A may have a high priority score due to its central location within the device topology. Entity 310A may be a centrally located router in a private network that connects entities 310B-D to each other and to an external network. Thus, if entity 310A fails, each network entity 310B-D may lose network connectivity. Accordingly, it is imperative that network monitoring services receive up to date information regarding entity 310A. A high priority score may ensure that polling operations are conducted more frequently for entity 310A.

Certain embodiments of the present disclosure may use such a device topology to determine related components when troubleshooting an error and increase the polling frequency for those related components based on priority scores that are increased while the error condition exists. The polling frequency for those related components may then be reduced when the error has been addressed or naturally subsides.

Figure 4:
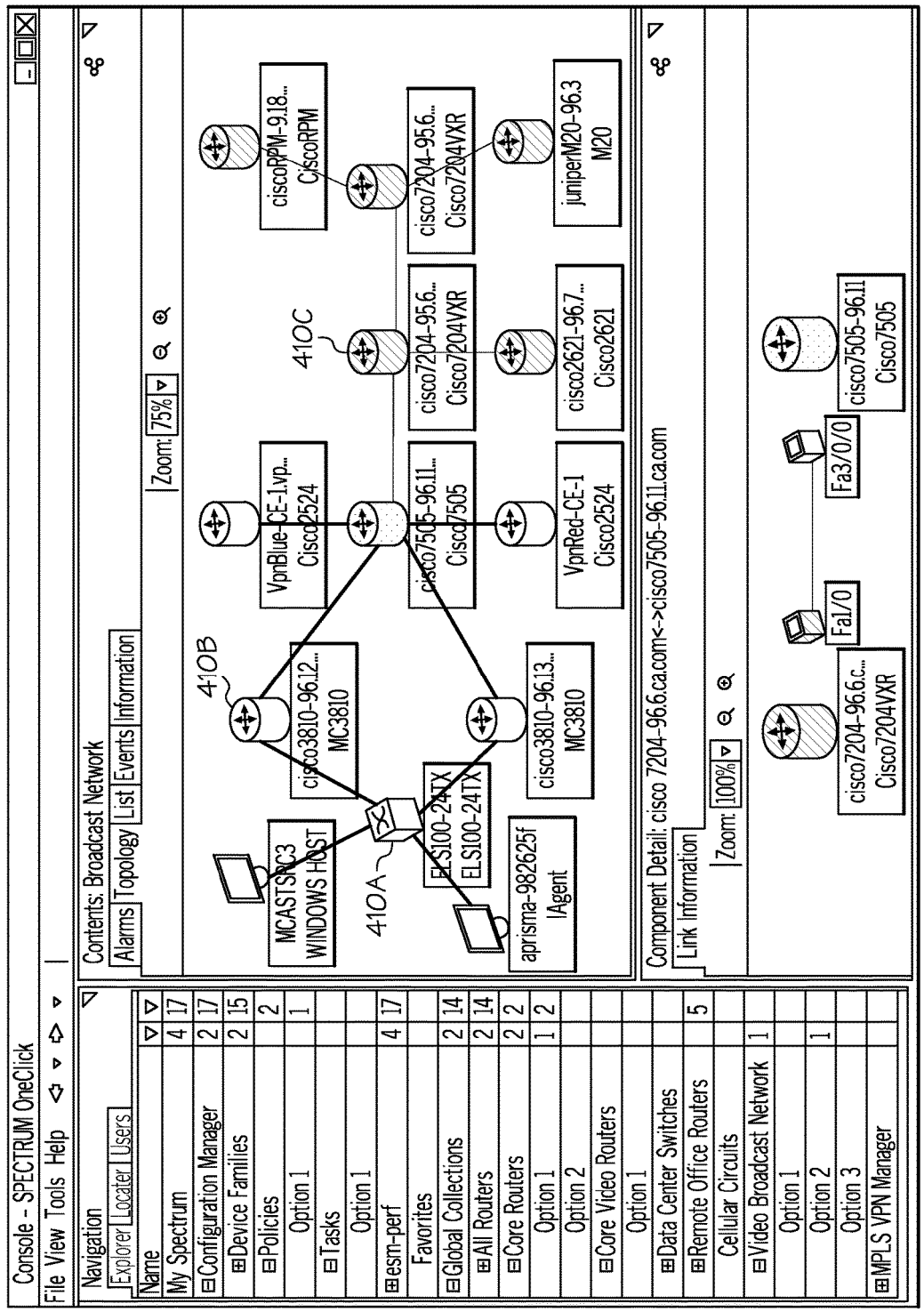
FIG. 4 illustrates an example device topology in a system for key network entity detection in accordance with a non-limiting embodiment of the present disclosure.

With reference to FIG. 4, an interface for viewing and navigating through a device topology in a system for key network entity detection is illustrated in accordance with a non-limiting embodiment of the present disclosure. The main window of the interface illustrates a zoomed in view of the device topology example, such as the one illustrated in FIG. 3. Text boxes describe each device component such as workstations with properties of each device components, such as "WINDOWSHOST", router names such as "CISCO7505", and "AGENT." The network devices or components are connected by edges which define relationships between the various components. The left column depicts a navigation window for quickly navigating through various views of the device topology. Such a navigation view may be helpful for viewing large topology maps for complex infrastructure systems. The topology displayed in this system may be used for determining polling frequency and determining related components based on relationships between components which are represented by edges.

Specialized probes can poll standard or proprietary management information base (MIB) objects from SNMP compliant devices. MIB objects may be monitored for threshold violations and alerts can be generated where necessary. Polled MIB data may be archived for trend reporting and/or may be leveraged for SLA creation, monitoring and reporting. Probes offer a flexible interface for configuring unique MIB object poll requirements and come equipped with a MIB browser.

SNMP-enabled network devices, including routers, switches, servers and printers can be configured to report various error conditions in the form of SNMP traps. Traps are automatically forwarded to a designated server, in most cases, a network management server. Infrastructure management and device polling solutions may include an SNMP trap receiver probe that will listen to certain reconfigurable ports for incoming events. Incoming events are formatted and analyzed for alert generation or are merely archived for trend reporting and other uses.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving, for each of a plurality of entities in a network associated with an organization:
     device information associated with the entity; and
     network traffic information regarding data packets associated with the entity;
   determining, using a processor, a priority score for each of the plurality of entities in the network based on the device information and the traffic information, wherein the priority score assesses an importance of the entity to the organization based on a type of the entity, a location of the entity in the network, and a number of previously detected errors that the entity is associated with;
   multiplying a set polling frequency for each of the plurality of entities by its respective priority score to determine a new polling frequency, wherein the new polling frequency for a first entity having a first priority score is greater than the new polling frequency for a second entity having a second priority score that is lower than the first priority score, wherein the first priority score was determined by identifying data packets in the traffic information for the first entity that are associated with financial transactions, and wherein the second priority score was determined by identifying data packets in the traffic information for the second entity associated with non-critical communications; and
   polling each of the plurality of entities at its new polling frequency.

2. The method of claim 1, further comprising determining a first amount of network traffic attributable to previous polling operations based on the network traffic information, wherein polling each of the plurality of entities at its new polling frequency generates a second amount of network traffic that is less than the first amount of network traffic.

3. The method of claim 1, further comprising receiving a user defined priority for at least one of the plurality of entities, and determining the new polling frequency for each of the plurality of entities based on the user defined priority and the priority scores.

4. The method of claim 1, further comprising:
   receiving fault isolation information indicative of a root cause entity responsible for a detected fault in the network;
   determining a particular entity from the plurality of entities that matches the root cause entity; and
   determining the priority score for each of the plurality of entities based on the fault isolation information.

5. The method of claim 1, wherein the device information associated with the entity comprises:
   information indicative of a device type of the entity;
   information indicative of a degree of network connectivity of the entity; and
   information indicative of networks that the entity is connected to.

6. The method of claim 1, wherein the network traffic information comprises:

information indicative of a volume of traffic associated with the entity;
information indicative of a type of traffic associated with the entity; and
information indicative of a propensity of traffic associated with the entity to generate revenue.

7. The method of claim 1, wherein polling each of the plurality of entities at its new polling frequency comprises polling for resource utilization and entity failure.

8. The method of claim 1, wherein the plurality of entities comprises virtual network elements and physical network elements.

9. The method of claim 1, further comprising:
determining that performance information for a particular entity deviates from a threshold, wherein the performance information for the particular entity is retrieved during the polling.

10. A computer configured to access a storage device, the computer comprising:
a processor; and
a non-transitory, computer-readable storage medium storing computer-readable instructions that when executed by the processor cause the computer to perform:
receiving, for each of a plurality of entities in a network associated with an organization:
device information associated with the entity; and
network traffic information regarding data packets associated with the entity;
determining, using a processor, a priority score for each of the plurality of entities in the network based on the device information and the traffic information, wherein the priority score assesses an importance of the entity to the organization based on a type of the entity, a location of the entity in the network, and a number of previously detected errors that the entity is associated with;
multiplying a set polling frequency for each of the plurality of entities by its respective priority score to determine a new polling frequency, wherein the new polling frequency for a first entity having a first priority score is greater than the new polling frequency for a second entity having a second priority score that is lower than the first priority score, wherein the first priority score was determined by identifying data packets in the traffic information for the first entity that are associated with financial transactions, and wherein the second priority score was determined by identifying data packets in the traffic information for the second entity associated with non-critical communications; and
polling each of the plurality of entities at its new polling frequency.

11. The computer of claim 10, wherein the computer-readable instructions further cause the computer to perform:
determining a first amount of network traffic attributable to previous polling operations based on the network traffic information, wherein polling each of the plurality of entities at its new polling frequency generates a second amount of network traffic that is less than the first amount of network traffic.

12. The computer of claim 10, wherein the computer-readable instructions further cause the computer to perform:
receiving a user defined priority for at least one of the plurality of entities, and determining the new polling frequency for each of the plurality of entities based on the user defined priority and the priority scores.

13. The computer of claim 10, wherein the computer-readable instructions further cause the computer to perform:
receiving fault isolation information indicative of a root cause entity responsible for a detected fault in the network;
determining a particular entity from the plurality of entities that matches the root cause entity; and
determining the priority score for each of the plurality of entities based on the fault isolation information.

14. The computer of claim 10, wherein the device information associated with the entity comprises:
information indicative of a device type of the entity;
information indicative of a degree of network connectivity of the entity; and
information indicative of networks that the entity is connected to.

15. The computer of claim 10, wherein the network traffic information comprises:
information indicative of a volume of traffic associated with the entity;
information indicative of a type of traffic associated with the entity; and
information indicative of a propensity of traffic associated with the entity to generate revenue.

16. The computer of claim 10, wherein polling each of the plurality of entities at its new polling frequency comprises polling for resource utilization and entity failure.

17. The computer of claim 10, wherein the plurality of entities comprises virtual network elements and physical network elements.

18. The computer of claim 10, wherein the computer-readable instructions further cause the computer to perform:
determining that performance information for a particular entity deviates from a threshold, wherein the performance information for the particular entity is retrieved during the polling.

19. A computer program product comprising:
a non-transitory computer-readable storage medium having computer-readable program code embodied therewith, the computer-readable program code comprising:
computer-readable program code configured to receive, for each of a plurality of entities in a network associated with an organization:
device information associated with the entity; and
network traffic information regarding data packets associated with the entity;
computer-readable program code configured to determine, using a processor, a priority score for each of the plurality of entities in the network based on the device information and the traffic information, wherein the priority score assesses an importance of the entity to the organization based on a type of the entity, a location of the entity in the network, and a number of previously detected errors that the entity is associated with;
computer-readable program code configured to multiply a set polling frequency for each of the plurality of entities by its respective priority score to determine a new polling frequency, wherein the new polling frequency for a first entity having a first priority score is greater than the new polling frequency for a second entity having a second priority score that is lower than the first priority score, wherein the first priority score was determined by identifying data packets in the traffic information for the first entity that are associated with financial transactions, and wherein the second priority score was determined by identifying data packets in the traffic information for the second entity associated with non-critical communications; and computer-readable program code configured to poll each of the plurality of entities at its new polling frequency.

20. The computer program product of claim 19, wherein the computer-readable program code further comprises:

computer-readable program code configured to determine a first amount of network traffic attributable to previous polling operations based on the network traffic information, wherein polling each of the plurality of entities at its new polling frequency generates a second amount of network traffic that is less than the first amount of network traffic.

\* \* \* \* \*